United States Patent [19]

Murakami

[11] Patent Number: 5,062,144
[45] Date of Patent: Oct. 29, 1991

[54] METHOD OF OBTAINING WHITE REFERENCE DATA USED FOR CORRECTING NON-UNIFORMITY IN PHOTOELECTRIC CELL ARRAY

[75] Inventor: Shigeo Murakami, Tenjinkitamachi, Japan

[73] Assignee: Dainippon Screen Mfg. Co. Ltd., Japan

[21] Appl. No.: 334,086

[22] Filed: Apr. 6, 1989

[30] Foreign Application Priority Data

Apr. 6, 1988 [JP] Japan .................. 63-85667

[51] Int. Cl.$^5$ .............................................. G06K 9/00
[52] U.S. Cl. ....................................... 382/52; 358/461; 358/464
[58] Field of Search ................... 358/461, 464; 382/52, 382/53

[56] References Cited

U.S. PATENT DOCUMENTS

| 4,523,229 | 6/1985 | Kanmoto | 358/461 |
| 4,550,435 | 10/1985 | Hayman | 382/52 |
| 4,760,464 | 7/1988 | Sakano | 382/53 |
| 4,829,379 | 3/1987 | Takaki | 358/461 |
| 4,903,145 | 8/1987 | Funada | 358/461 |
| 4,916,549 | 6/1988 | Sekizawa | 358/461 |
| 4,972,502 | 11/1990 | Katsuta et al. | 382/52 |

FOREIGN PATENT DOCUMENTS 57-81773 5/1982 Japan .
58-106956 6/1983 Japan .
59-131266 6/1984 Japan .

Primary Examiner—Leo H. Boudreau
Assistant Examiner—Rohini Khanna
Attorney, Agent, or Firm—Ostrolenk, Faber, Gerb & Soffen

[57] ABSTRACT

In an image scan reader, a white reference plate is attached to a transparent plate on which an original is to be placed. Different regions are defined on the reference plate and respective optical densities on a plurality of scanning lines ($L_{A1}$–$L_{An}$, $L_{B1}$–$L_{Bm}$) are detected and averaged within each region ($R_A$, $R_B$). The maximum averaged densities are selected for each given pixel position to be used for correcting the non-uniformity of CCD cells which are employed in reading the white reference plate and the image of the original.

12 Claims, 3 Drawing Sheets

METHOD OF OBTAINING WHITE REFERENCE DATA USED FOR CORRECTING NON-UNIFORMITY IN PHOTOELECTRIC CELL ARRAY

BACKGROUND OF THE INVENTION

1. Field of the Invention

The present invention relates to a method of obtaining a white reference data which is used for correcting non-uniformity in photoelectric cell array, which is provided in an image scan reader such as process scanner.

2. Description of Background Arts

As is well known in the art, a linear photoelectric cell array is provided in an image scan reader for reading an original image for each scanning line. The linear photoelectric cell array has a number of photocells. The respective photoelectric output signals of the photocells are not uniform even if they read an original image having uniform optical density because of non-uniformity in sensitivity of the photocells and illumination of an original as well as fluctuation of dark currents in the photocells. In order to compensate the non-uniformity, the photoelectic signals are so corrected that uniform signals can be obtained when an original in a uniform density is read with the linear photoelectric cell array. The correction is known in the art as "shading correction".

In shading correction, a reference white plate having an uniform density is prepared, and white reference signals are generated by reading the white plane with the photoelectric cell array. A shading correction table is then produced with reference to respective levels of the white reference signals.

However, a white reference plate having complete uniformity in density is hardly ever obtained in practice, since various defects such as dusts and scratches often exist on white reference plates. Consequently, a manufacturer and a user of the image scan reader are obliged to conduct the shading correction with a defective white reference plate.

In one improvement in the shading correction process, the white reference plane is read with the linear photoelectric cell array through an optical system which is out of focus, thereby, the defects on the white reference plate are smoothed when they are projected onto the linear photoelectric cell array. However, this improvement has the disadvantage that the smoothing is not sufficient if the original image is projected onto the linear photoelectric cell array through a reduction optical system which has a large depth of field. When the white reference plate is displaced for from the original so that sufficient smoothing can be obtained, the condition of illumination on the white reference plate is different from that of the original, whereby the shading correction loses its accuracy.

In another improvement of the shading correction process, the white plate is read for a plurarity of scanning lines, to thereby obtain a plural sets of white reference signals. Then, the plural sets of the white reference signals are compared with each other, and one of them which has maximum levels is employed for the shading correction. Although the improvement has the advantage that it avoids the influence of dark defects on the white reference plate, electric noises or spurious peaks which may develop in the linear photoelectric cell array and a signal processor are fetched as "maximum levels", whereby meaningless peaks are undesirably used for the shading correction.

SUMMARY OF THE INVENTION

The present invention is directed to a method of obtaining a white reference data which is so used for correcting the non-uniformity in output signals of a linear photoelectric cell array that the output signals of the linear photoelectric cell array are selectively enhanced or suppressed according to the white reference data when the output signals are obtained by reading an image of an original with the linear photoelectric cell array.

According to the present invention, the method comprises the steps of: (1) preparing a white reference plane which includes N regions arrayed in a first direction X, where N is an integer larger than one, (2) generating N averaged data through the steps of: (2a) selecting a J-th region within the N regions, where J is an integer satisfying the condition $1 \leq J \leq N$, (2b) by means of the linear photoelectric cell array, detecting two dimensional distribution of optical densities in the J-th region to generate a J-th white density data expressing the two dimensional distribution, (2c) averaging the J-th white density data in the first direction X to generate a J-th averaged data which includes a plurality of components assigned to respective positions which are discriminated from each other with Y-coordinate values, where Y is a second direction which is parpendicular to the first direction X, and (2d) repeating the step (2a) through (2c) while serially updating the integer J under the condition $1 \leq J \leq N$, to thereby generate the first through N-th averaged data, (3) comparing the first through N-th averaged data with each other to select a maximum one of the first through N-th averaged data for each position indicated with a Y-coordinate value, whereby a plurality of selected maximums corresponding to respective Y-coordinate values are identified, and (4) generating the white reference data in accordance with the plurality of the selected maximums.

Preferably, the two-dimensional distribution of optical densities are detected as those on an array of scanning lines. The respective one-dimensional distribution on the scanning lines are averaged, whereby the averaged data for the J-th region ($1 \leq J \leq N$) is obtained.

The N regions may be arrayed on a single white reference plate, or alternatively, the same might be provided on different plates. Undesirable noises or temporary peaks which may be caused by small detects of the white reference plane are averaged through the averaging step, while influence from relatively large defects is eliminated by employing the maximum one of the first to N-th averaged data for each Y-coordinate value. Consequently, the white reference data thus obtained is suitable for shading correction or correction of non-uniformity in the linear photosensor array.

The present intention is also intended for an image scan reader having the function of correcting the nonuniformity. According to the present invention, the image scan reader comprises (1) supporting means for supporting an original, (2) a white reference plate attached to the supporting means, (3) linear photosensor array means provided to face the supporting means, (4) means for relatively moving the supporting means and the linear photosensor array, (5) means for enabling the means (3) and (4) to detect distribution of optical densities on the white reference plate for M scanning lines, where M is an image integer satisfying the condition $M = n + m$ and each of n and m is an integer larger than one, (6) means for averaging the distribution for n scanning lines within the M scanning lines to generate a first averaged data, (7) means for averaging the distribution for the other m scanning lines within the M scanning liens to generate a second averaged data, (8) comparing means for comparing the first and second averaged data with each other to select maximum value of the first and second averaged data for each position along a scanning line so that a set of maximum values are obtained, (9) means for generating a white reference data in accordance with the set of the maximum values, (10) means for enabling the means (3) and (4) to read an image of the original for each scanning line, to thereby generate an original image data, and (11) means for correcting the original image data in accordance with the white reference data.

Accordingly, an object of the present invention is to obtain a white reference data which is essentially free of the undesirable influence of noise and defects normally associated with a white reference plane.

Another object is to obtain a white reference data with a focussed optical system.

Another object is to generate white reference data regardless of the depth of field of an optical system.

These and other objects, features, aspects and advantages of the present invention will become more apparent from the following detailed description of the present invention when taken in conjunction with the accompanying drawings.

DESCRIPTION OF PREFERRED EMBODIMENTS

Figure 1:
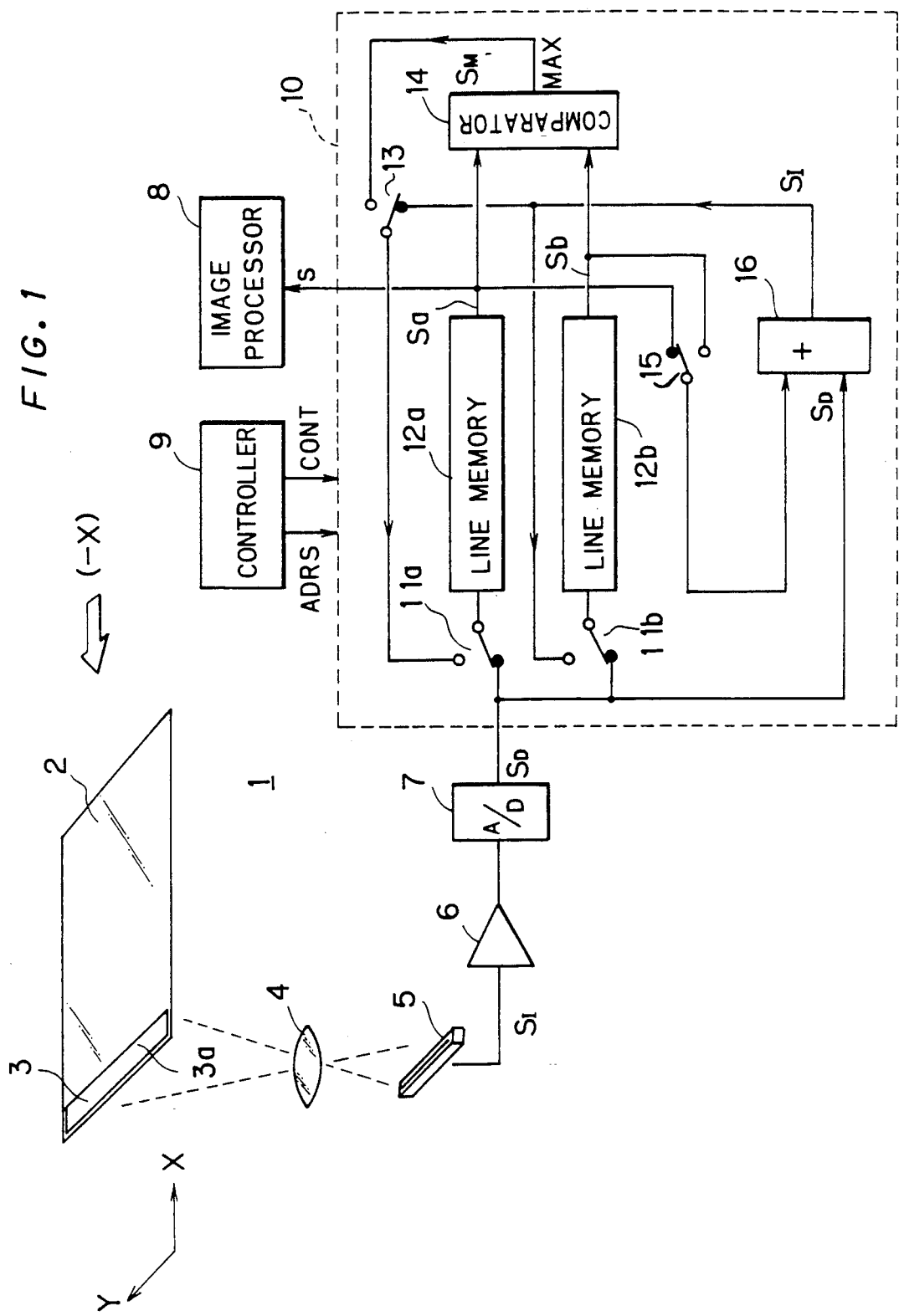
FIG. 1 is a schematic diagram of an image scan reader according to a preferred embodiment of the present invention.

FIG. 1 shows an image scan reader 1, of the flat bed type, to which a preferred embodiment of the present invention is applied. The image scan reader 1 comprises a transparent plate member 2 on which an original (not shown) is placed with its face down. A white reference plate 3 is attached to an end portion of the transparent plate 2. The white reference plate 3 has the shape of a strip, and its longitudinal direction is parallel to a main scanning direction Y. The white reference plate 3 may be a conventional one, its bottom surface comprising a white reference plate 3a.

A focussed projection lens 4 is provided under the transparent plate 2, through which the density distribution on the white reference plane 3a or the image of the original on the transparent plate 2 is projected onto the sensing surface of a CCD linear photosensor 5. The CCD linear photosensor 5 has a linear array of CCD cells (not shown). A main scanning along the direction Y is attained by serially accessing the CCD cells along the alignment thereof so as to generate a series of photoelectric signals $S_I$. The image reading with the CCD linear photosensor 5 is conducted while moving the transparent plate 2 along the direction (—X), whereby a subscanning along the direction X is attained for the white reference plane 3a or the original which is placed on the transparent plate 2.

The photoelectric signals or linear image signals $S_I$ thus obtained from the CCD linear photosensor 5 are amplified in an analog amplifier 6, and then converted into a digital data $S_D$ by an A/D converter 7.

When the white reference plane 3a is read with the CCD linear photosensor 5, in order to obtain a white reference data for shading correction, the digital data $S_D$ is a "white density data" expressing two-dimensional distribution of optical densities on the white reference plane 3a as density distribution on a pixel array. On the other hand, when the original is read after the reference data has been obtained, the digital data $S_D$ is an "image data" which defines the image of the original for each pixel. Since the gist of the present invention relates to the process of obtaining the white reference data for the shading correction, the following description will be mainly directed to the first stage in the process in which the white reference plane 3a is read and the digital data $S_D$ comprises the white density data.

The white density data $S_D$ is delivered to a circuit 10 for generating the white reference data. The circuit 10 generates the white reference data S for one scanning line through a process which will be described later, and the white reference data S is delivered to an image processor 8. After the delivery of the white reference data S, the image of the original is read with the CCD linear photosensor 5 and the image data thus obtained is transmitted to the image processor 8 through a transmission path (not shown) while bypassing the circuit 10. Shading correction for the image data is attained in the image processor 10 on the basis of the white reference data S. Gradation correction and other controls for reproducing the image on a photosensitive material through scanning are also carried out in the image processor 8. The image processor 8 may include a divider for dividing the white reference data S by an integer, which will be described later. The controller 9 is operable to control the circuit 10.

DETAILS OF A PREFERRED EMBODIMENT

Figure 2:
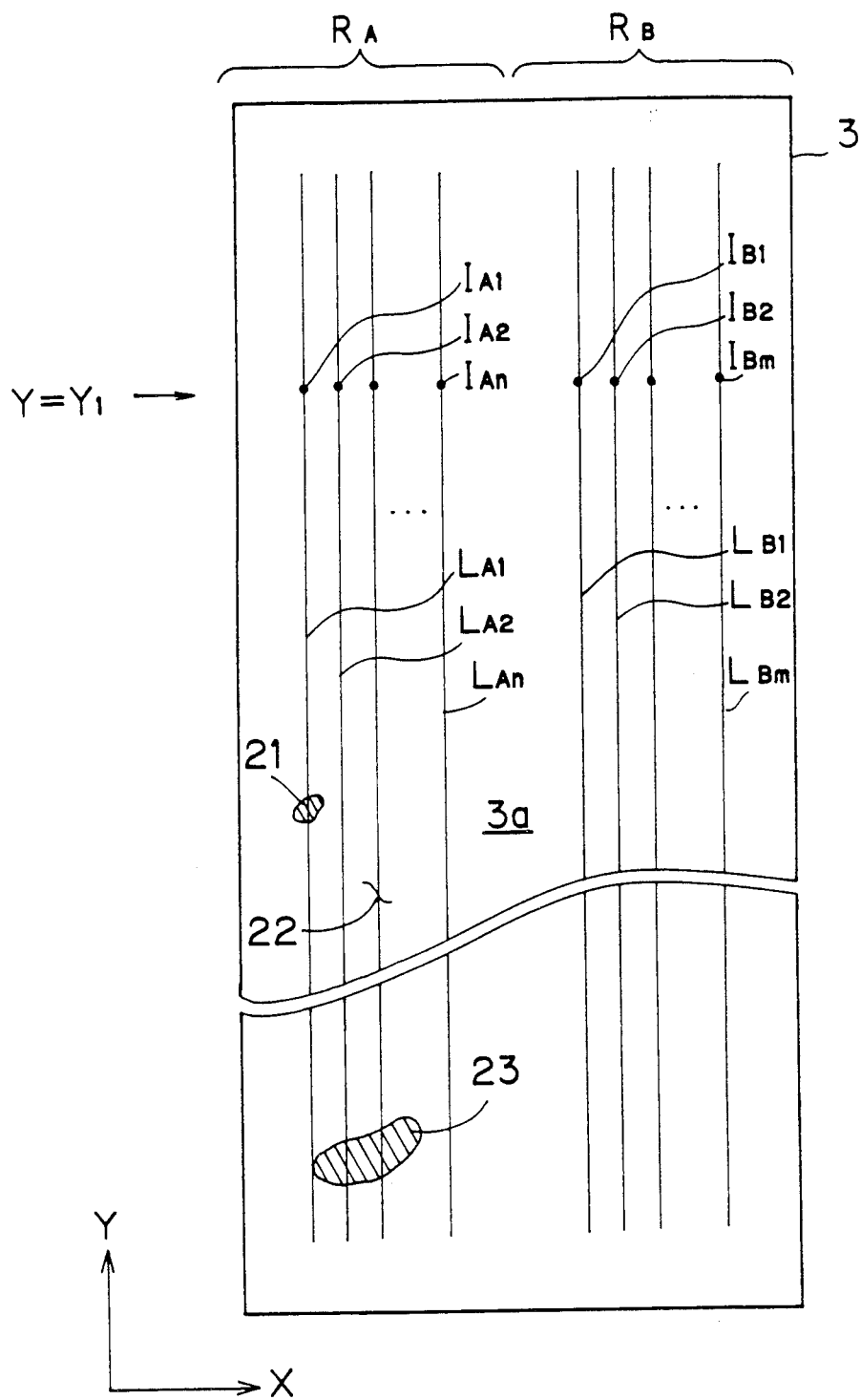
FIG. 2 is a schematic diagram showing a white reference plane 3a which is conceptually divided into two areas $R_A$ and $R_B$.

In the process of generating the white reference data S, the white reference plane 3a is conceptually divided into a plurality of regions $R_A$ and $R_B$ (FIG. 2) aligned along the subscanning direction X. Since the white reference plane 3a has the shape of a strip extending along the main scanning direction Y, the regins $R_A$ and $R_B$ are partial strips extending along the longitudinal direction of the white reference plane 3a and are parallel to each other. It is to be noted that the division of the white reference plane 3a is only conceptual, its purpose being for facilitating understanding of the present invention. The division is not an actual division of the white reference plane 3a. However, if desired, the white reference plate 3 may be actually divided into two strips of sub-plates to separate the regions $R_A$ and $R_B$ pysically from each other. That is, the regions $R_A$ and $R_B$ may be defined on a single plate, or alternatively, they may be defined on different sub-plates. In the preferred embodiment, the regions $R_A$ and $R_B$ exist on a single reference plane 3, as shown in FIG. 2, in order to avoid increasing of the number of members.

On the regoins $R_A$ and $R_B$, parallel scanning lines $L_{A1}$-$L_{An}$ ($n \geq 2$) and $L_{B1}$-$L_{Bm}$ ($m \geq 2$) are provided, respectively. The integers n and m may be equal to each other, or alternatively, they may be different from each other. These scanning lines are defined in scanning of the regions $R_A$ and $R_B$, but are not real lines drawn on the white reference plane 3a. Since the division of the white reference plane 3a and the establishment of scanning lines $L_{A1}$-$L_{An}$ and $L_{B1}$-$L_{Bm}$ are conceptionally attained through data processings accompanied with the scanning of the white reference plane 3a, the white reference plate 3 itself may be a simple white plate.

Figure 3:
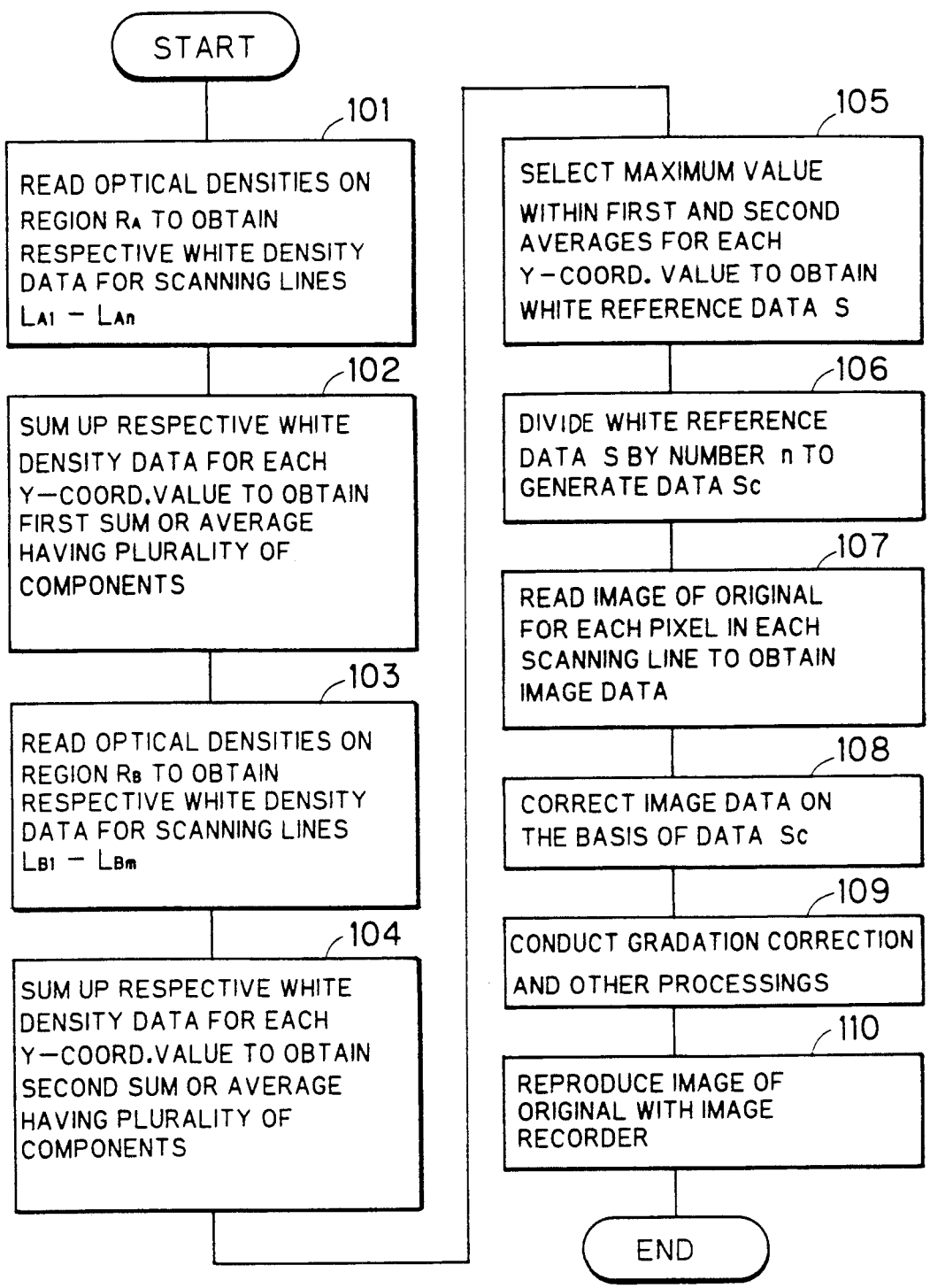
FIG. 3 is a flow chart of process steps conducted in the image scan reader.

In response to a start command, the optical densities on the scanning lines $L_{A1}$-$L_{An}$ of the first region $R_A$ are read or detected for each pixel by the CCD linear photosensor 5 (see the process step 101 in FIG. 3). The detection is conducted while moving the transparent plate 2 along the direction (—X) with the white reference plate 3 placed thereon, whereby the respective optical densities on the scanning lines $L_{A1}$-$L_{An}$ are serially read or detected in that order. A one-dimensional white density data $S_D$ for the first scanning line $L_{A1}$ which is thus obtained has K components, where K is the number of the cells in the CCD linear photosensor 5. The number K also expresses the number of pixels on one scanning line which are discriminated from each other with respective Y-coordinate values. The data $S_D$ is stored in a line memory 12a (FIG. 1) for each pixel through a selector 11a. Then, the white density data $S_D$ for the first scanning line $L_{A1}$ is read out from the line memory 12a for each pixel as a data $S_a$ synchronously with the detection of white density data $S_D$ for the second scanning line $L_{A2}$, and is supplied to an adder 16 through a selector 15. The other input of the adder 16 is the one-dimensional white density data $S_D$ for the second density data. Those two inputs of the adder 16 are added to each other therein for each pixel, to become a data $S_I$.

Prior to the addition in the adder 16, the selector 11a is switched to connect the line memory 12a to a selector 13, and the selector 13 is controlled to connect the adder 16 to the line memory 12a, so that a loop which, cyclically connects the line memory 12a, the selector 15, the adder 16 and the selectors 13 and 11a is established. Consequently, the data $S_I$ is transmitted to the line memory 12a, and is stored for each pixel at corresponding addresses in the line memory 12a, while serially deleting the old data previously stored therein. That is, the old data in the line memory 12a is replaced with the new data $S_I$ through a read-modify-write operation. Another line memory 12b and a comparator 14 are disenabled during the aforementioned process, and do not contribute to the operation of the loop. Each of the line memories 12a and 12b has a storage capacity corresponding to one scanning line.

The controller 9 is operable to generate address signals ADRS and control signals CONT, by which read-/write control of the line memories 11a and 11b is obtained. The timing and such of the other elements in the circuit 10 are also controlled by the control signals CONT.

The read-modify-write operation is repeated for all the scanning lines $L_{A1}$-$L_{An}$ of the first region $R_A$, so that respective white density data for the scanning lines $L_{A1}$-$L_{An}$ are accumulated or summed up along the subscanning direction X for each Y-coordinate value (the process step 102). A data $S_{ACC}$ (not shown) representing the accumulated values or sums is stored in the line memory 11a. Since the accumulation is conducted only along the subscanning direction X, the data $S_{ACC}$ includes a number of components corresponding to respective Y-coordinate values or pixels. For example, the component $D_1$ of the data $S_{ACC}$ comprises the sum at the position $Y=Y_1$ (FIG. 2) and can be written as;

$$D_1 = I_{A1} + I_{A2} + \ldots + I_{An} \qquad (1)$$

where $I_{A1}$-$I_{An}$ are the values of the white density data $S_D$ at respecive pixels having the coordinate $Y=Y_1$ on the scanning lines $L_{A1}$-$L_{An}$. Similarily, the other components of the data $S_{ACC}$ express the respective sums at the other Y-coordinate values, respectively, and therefore, the data $S_D$ consists of K-components.

The data $S_{ACC}$ is substantially equivalent to an average $S_{AV}$ of the respective white density data for the scanning lines $L_{A1}$-$L_{An}$ since the data $S_{ACC}$ expresses the sums and the number or factor n is a constant in the definition of the average $S_{AV}$:

$$S_{AV} = S_{ACC}/n \qquad (2)$$

The value of the average $S_{AV}$ can be obtained by dividing the value of the data $S_{ACC}$ by the number n. If the number n is equal to m, the average $S_{AV}$ can be directly obtained by providing a 1/n-divider at the front stage of the circuit 10. However, since the average $S_{AV}$ can be easily estimated from the data $S_{ACC}$, such a 1/n-divider may be omitted as shown in FIG. 1. In the present invention, the term "average" is used in its broad sense, and it may be any quantity expressing a collective characteristic of white density data. The data $S_{ACC}$ is directly proportional to the simple average $S_{AV}$ and therefore, the data is included in the concept of the "average" in the broad sense.

After the "averaged" data for the first region $R_A$ is obtained in the line memory 12a in the form of the data $S_{ACC}$, similar operation is conducted for the second region $R_B$ (process steps 103 and 104). In the process for the second region $R_B$, the line memory 12b is used and the selector 15 selects an output $S_b$ of the line memory 12b. The selector 11b connects the line memory 12b to the A/D converter 7 in order to fetch the white density data $S_D$ for the scanning line $L_{B1}$ into the line memory 12b, and then, is switched to the other side for transmitting the output of the adder 16 to the line memory 12b. An accumulation or summation through read-modify-write operation is carried out in another loop consisting of elements 12b, 15, 16 and 11b. Therefore, when the detection of respective density levels is completed for the scanning lines $L_{B1}$-$L_{Bm}$ of the second region $R_B$, sums or "averages" of respective white density data for the scanning lines $L_{B1}$-$L_{Bm}$ are obtained in the line memory 12b in the form of an "averaged" data including a plurality of components which express the averaged white density level for each Y-coordinate value or pixel position.

For example, the component $D_2$ corresponding to the position $Y=Y_1$ is the sum or average of respective white density data $L_{B1}$-$L_{Bm}$ at the position $Y=Y_1$ on the scanning lines $L_{B1}$-$L_{Bm}$, i.e., $$D_2 = I_{B1} + I_{B2} + \ldots + I_{Bm} \qquad (3)$$

The first and second averaged data which are stored in the line memories 12a and 12b respectively are read out from the same for each pixel or Y-coordinate value, to be delivered to the comparator 14. The comparator 14 compares the respective averaged data with each other to find the maximum (MAX) data for each Y-coordinate value (the process step 105). The maximum values MAX for respective Y-coordinate values are serially output from the comparator 16 as a maximum white data $S_M$. The selectors 13 and 11a are switched to the comparator 16, and the maximum white data $S_M$ is stored in the line memory 12a for each pixel or Y-coordinate value. As the storing operation progresses, the averaged data which has been stored in the line memory 12a is serially deleted and replaced with the data $S_M$.

After the maximum white data $S_M$ for all of the Y-coordinate values is stored in the line memory 12a, the data $S_M$ is read out from the line memory 12a serially all is delivered to the image processor 8, as the white reference data S. The white reference data S includes K components corresponding to the number of the pixels, i.e. coordinate values along the direction Y. At each Y-coordinate value, the corresponding component expresses the maximum one of the first and second averaged data. If $D_1 > D_2$ at $Y = Y_1$, the component of the white reference data S for $Y = Y_1$ is the larger $D_1$ data. From the expressions (1) and (3), the following relation holds:

$$S(Y = Y_1) = \max\left[\sum_{i=1}^{n} I_{Ai}, \sum_{i=1}^{m} I_{Bi}\right] \quad (4)$$

where $n = m$. A similar relation holds for other values of Y.

In the next process step 106, the 1/n divider which is provided in the image processor 8 divides the white reference data S by the number n ($=m$), to thereby generate a data $S_C$ (not shown).

$$S_C(Y = Y_1) = \max\left[\sum_{i=1}^{n} I_{Ai}/n, \sum_{i=1}^{n} I_{Bi}/n\right] \quad (5)$$

On the other hand, when $n \neq m$, a 1/n divider is inserted between the comparator 14 and the line memory 12a, while a 1/m divider is inserted between the comparator 14 and the line memory 12b. In this case, the 1/n divider in the image processor 8 is omitted since the data $S_C$ is just a straight forward average of the white density data which is obtained in the circuit 10 in the form of:

$$S_C(Y = Y_1) = \max\left[\sum_{i=1}^{n} I_{Ai}/n, \sum_{i=1}^{m} I_{Bi}/m\right] \quad (6)$$

The other components of the data $S_c$ corresponding to Y-coordinate values other than $Y = Y_1$ are also obtained as values similar to the expression (5) or (6).

After the data $S_c$ is obtained, the image of the original is read with the CCD linear photosensor 5 for each pixel on each scanning line through the combination of the main scanning and the subscanning (the process step 107), and the image data is transmitted to the image processor 8. The image processor 8 corrects the image data on the basis of the data $S_c$ which expresses the non-uniformity in the CCD cells (the process step 108). That is, the image data for pixels having a Y-coordinate value at which the data $S_c$ indicates a relatively small value (i.e., "dark" value) is relatively enhanced, and/or those having a Y-coordinate value at which the data $S_c$ indicates a relatively large value (i.e., "light" value) is relatively suppressed. The corrected image data is then subjected to gradation correction and other processings (the process step 109), to be delivered to an image recorder (not shown) for image recording or reproducing of the original image for each pixel (the process step 110).

ADVANTAGES OF PREFERRED EMBODIMENT AND MODIFICATION

According to the preferred embodiment, the respective white density data for the plurality of the scanning lines $L_{A1}$–$L_{An}$ ($L_{B1}$–$L_{Bm}$) are averaged in each of the regions $R_A$ and $R_B$, and therefore, fluctuations in optical density which caused by small defects such a small dust 21 and a scratch 22 (FIG. 2) are smoothed. Furthermore, if a relatively large dust particle 23 exists on the white reference plane 3a, the influence of the dust particle 23 on the white reference data S is eliminated by using the maximum data within respective averaged white density data for the regions $R_A$ and $R_B$, since the dust 23 is not so large as to extend from one region to another region in most cases. Consequently, the white reference data S is correct and desirable to use because the influence of the defects is substantially eliminated and the data S is comparable to that obtained from an ideal, completely white reference plane which has no defects.

If the image scan reader 1 is provided with a white reference plate and a black reference plate in order to obtain a white reference data and a black reference data, respectively, the circuit 10 may be used for obtaining the black reference data as well as the white reference data. Since the circuit 10 has a relatively simple structure, the same can be produced without an increase in cost.

The white reference plane 3a may be conceptually or actually divided into three or more regions. In general, when the number of regions is N ($N \geq 2$), the process steps of detecting two-dimensional distribution of optical densities in a J-th region ($1 \leq J \leq N$) and averaging the same in the subscanning direction X are repeated for all of the integers J within $1 \leq J \leq N$. The average of the white density data may be a square root of a square sum, a geometrical mean, or the like. The maximum white data $S_M$ expresses the whitest density value for each pixel within the respective averaged data, and therefore, it is the maximum value when the white density data $S_D$ expresses lightness, while it is the minimum value when the white density data $S_D$ expresses darkness. The later case corresponds to a modification where the white density data $S_D$ is obtained through a circuit for taking a complement of the photoelectric signals $S_I$. That is, the term "maximum" is used for indicating the lightest optical density in the present invention so that local darkness which is caused by the defects on the white reference plane is eliminated from the white reference data. The white reference plane may be a part of the transparent plate 2 which is painted white.

Although the present invention has been described and illustrated in detail, it is to be clearly understood that the same is by way of illustration and example only and is not to be taken by way of limitation, the spirit and scope of the present invention being limited only by the terms of the appended claims.

I claim:

1. A method for obtaining white reference data for correcting therewith a non-uniformity in output signals of a linear photoelectric cell array, said method comprising the steps of;
(1) providing a white reference plane which includes N regions arrayed in a first direction X, where N is an integer larger than one,
(2) generating N averaged data through the steps of:
(2a) selecting a J-th region within said N regions, where J is an integer satisfying $1 \leq J \leq N$,
(2b) detecting, by means of said linear photoelectric cell array, a two dimensional distribution of optical densities in said J-th region and generating a J-th white density data expressing said two dimensional distribution,
(2c) averaging said J-th white density data in said first direction X to generate a respective J-th averaged data for each different Y-coordinate value, where Y is a second direction perpendicular to said first direction X, and
(2d) repeating the steps (2a) through (2c) while serially updating the integer J under the condition $1 \leq J \leq N$, to thereby generate said N averaged data,
(3) comparing said Jth averaged data with (J+1)th averaged data and selecting the largest of said averaged data for each Y-coordinate value, whereby a plurality of selected maximum averaged data values are identified for respective Y-coordinate values, and
(4) generating said white reference data in accordance with said plurality of said selected maximum average data values.

2. The method of claim 1, wherein
the step (2b) includes the steps of:
(2b-1) detecting, by means of said linear cell array, a one dimensional distribution of optical densities in each of plural scanning lines which extend along said second direction Y and which are arrayed in said first direction X, to thereby generate a plurality of one-dimensional density data as said J-th white density data, and
the step (2c) includes the steps of:
(2c-1) averaging said plurality of said one-dimensional density data in said first direction X to generate said J-th averaged data.

3. The method of claim 2, wherein
said maximum averaged data values represents the whitest optical density assigned to a same Y-coordinate value.

4. The method of claim 3, wherein
an equal number of scanning lines is defined on each of said N regions,
each of the plurality of said one-dimensional density data has K component, where K is an integer which specifies the number of pixels having different Y-coordinate values on one scanning line, and
the step (2c-1) includes the step of:
summing respective components of the plurality of said line density data for each Y-coordinate value to thereby generate said J-th averaged data.

5. The method of claim 4, including
providing said linear photoelectric cell array in an image scan reader, and wherein
said image scan reader is operable to read an image of an original through scanning thereof along a main scanning and a subscanning direction, and wherein
said first and second directions respectively extend along said subscanning direction and said main scanning direction in said image scan reader, respectively.

6. The method of claim 4, wherein
said white reference plane is a surface of a single white reference plate, and
said N regions are strip regions having respective longitudinal directions which extend parallel to said second direction.

7. An image scan reader, comprising:
(1) supporting means for supporting an original,
(2) a white reference plate attached to said supporting means,
(3) linear photosensor array means facing said supporting means,
(4) moving means for moving said supporting means and said linear photosensor array relative to each other,
(5) first control means, associated with said photosensor array means and said moving means and effective to cause the same to detect the distribution of optical densities on said white reference plate for M scanning lines each of which is comprised of a plurality of image pixel positions, M being an integer satisfying the condition $M = n + m$ and each of n and m being an integer larger than one,
(6) means for averaging said distribution for n of M scanning lines by averaging the white density data in a first direction X and repeating the same for each different Y coordinate value of said n scanning lines to generate first averaged data where Y is a second direction perpendicular to said first direction X;
(7) means for averaging said distribution for m of said M scanning lines by averaging the white density data in the first direction X and repeating the same for each different Y coordinate value of said m scanning lines to generate second average data;
(8) comparing means for comparing values of said first averaged data to the values of the second averaged data for each different Y-coordinate values and selecting the largest of said averaged data for respective Y-coordinate values thereby to obtain a set of maximum averaged values;
(9) means for generating a white reference data in accordance with said set of maximum averaged values,
(10) second control means associated with said photosensor array means and said moving means and effective to cause the same to read an image of said original for each scanning line, to thereby generate original image data, and
(11) means for correcting said original image data in accordance with said white reference data.

8. The image scan reader of claim 7, wherein
said n scanning lines are defined on a first region of a surface of said white reference plate,
said m scanning lines are defined on a second region of said surface, and
said first and second regions are strip regions which extend parallel to each other.

9. An image scan reader, comprising:
means for scanning an original including a supporting means for supporting an original and a photosensor for scanning the original;
means for compensating for a non-uniformity associated with output signals of said photosensor, said compensating means including control means for causing said photosensor to scan a white reference plate disposed on said supporting means along a plurality of scanning lines, each said scanning line comprising a plurality of pixel positions along a predetermined direction, and being effective for detecting the optical density on said white reference plate at each pixel position;

means for averaging said distribution for n of M scanning lines by averaging the white density data in a first direction X and repeating the same for each different Y coordinate value of said n scanning lines to generate first averaged data where Y is a second direction perpendicular to said first direction X;

means for averaging said distribution for m of M scanning lines by averaging the white density data in the first direction X and repeating the same for each different Y coordinate value of said m scanning lines to generate second averaged data;

comparing means for comparing values of said first averaged data to the values of the second averaged data for each different Y-coordinate values selecting the largest of said averaged data for respective Y-coordinate value thereby to obtain a set of maximum averaged values; and means for correcting measurements of optical density taken in relation to said original by reference to said set of maximum averaged values.

10. The image scan reader of claim 9, wherein n and m are equal to one another.

11. The image scan reader of claim 9, wherein n and m are unequal to one another and including divider means for generating averages of said optical densities.

12. The image scan reader of claim 9, further comprising at least one line memory having a number of memory locations at least as large as the number of said image pixels.

* * * * *